United States Patent

Dölling et al.

[11] Patent Number: 5,932,041
[45] Date of Patent: *Aug. 3, 1999

[54] METHOD FOR THE FUSION CUTTING OF THERMOPLASTIC SHEETS AND TEXTILE WEBS

[75] Inventors: Ludvik Dölling, Otterfing; Wilhelm Haag, Riemerling; Otto Wiedemann, Starnberg, all of Germany

[73] Assignee: AGFA-Gevaert AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,914

[22] Filed: Aug. 18, 1997

[30] Foreign Application Priority Data

Aug. 26, 1996 [DE] Germany ............. 196 34 386

[51] Int. Cl.⁶ ............. B29C 65/08; B32B 31/18
[52] U.S. Cl. ............. 156/73.3; 156/73.2; 156/88; 156/251; 156/269; 156/271; 156/515; 156/580.1; 156/580.2
[58] Field of Search ............. 156/88, 73.3, 73.2, 156/251, 580.1, 580.2, 271, 269, 515

[56] References Cited

U.S. PATENT DOCUMENTS 2,535,029 12/1950 Atanasoff et al. ............. 156/88
2,756,819 7/1956 Judelson ............. 156/88 X
3,607,538 9/1971 Fuller et al. ............. 156/271
3,607,573 9/1971 Michaelides et al. ............. 156/269 X
4,594,955 6/1986 Lichtenberg ............. 112/147
4,662,037 5/1987 Provost et al. ............. 156/73.3 X
4,693,771 9/1987 Payet et al. ............. 156/73.3

FOREIGN PATENT DOCUMENTS 3608787 10/1987 Germany.

Primary Examiner—Jeff H. Aftergut
Attorney, Agent, or Firm—Connolly & Hutz

[57] ABSTRACT

Fusion cutting of thermoplastic sheets and textile webs involving bonding of the cut edges is achieved with excellent quality without the accumulation of dirt particles, if the material to be cut is subjected, in the area of the intended cut, to pre-stamping and cutting in immediate succession, under heat and with precise guidance of the separator device in relation to the pre-stamping device, said pre-stamping and cutting being effected in such a way that the plane of symmetry through the pre-stamping device, which plane of symmetry extends perpendicularly to and in the same direction as the material web, is identical to the plane of symmetry extending through the separator device.

4 Claims, 1 Drawing Sheet

METHOD FOR THE FUSION CUTTING OF THERMOPLASTIC SHEETS AND TEXTILE WEBS

The invention relates to a method and a device for the fusion cutting of thermo-plastic sheets and textile webs based on the use of two separator members and a heat source.

135 system photographic films (miniature films) are used in cartridges which are inserted into the camera and in which the film is wound onto a rotatable spool and is wound off the spool in the camera, frame by frame, through the cartridge mouth. No light can reach the inside of the cartridge through the mouth thereof. For this reason, the upper and lower lips of the cartridge mouth are lined with narrow velvet strips, which are cut from wide velvet webs.

The invention relates on the one hand to a method for the fusion cutting of wide velvet strips into narrow velvet strips, but may also be applied to the cutting of other textile webs and to the cutting of thermoplastic sheets. The method is distinguished, in particular, by the fact that the cut edges are bonded by fusion of the material, thereby preventing the formation of dirt while cutting which could settle on the photographic film, for example, and there lead to defects.

Previously known methods of fusion cutting are not suited to the satisfactory achievement of these objects.

On the one hand, it is known to guide the textile web between a heat source and a separator wheel, which is pressed with a certain compressive force against the textile web. The heat source, for example an ultrasonic sonotrode, causes partial fusion of the material, which is then separated by the stationary separator wheel.

A narrow separator wheel cuts easily through the material, but does not bond the cut edges to the required extent, such that fluffing and fuzzing occur, which contaminate the photographic material. A wide separator wheel does bond the cut edges satisfactorily but its cutting quality is inadequate.

On the other hand, it is known to precede the cutting process proper by pre-stamping, which is carried out under heat, compressing the material to a smaller thickness than before and causing momentary fusion thereof (without cutting being effected), cutting being carried out thereafter by means of a separator wheel pressed against a counter roll, wherein the material is guided between separator wheel and counter roll. The pre-stamped path is considerably wider than the separating path, to ensure that the separating path remains on the pre-stamped path in the case of slight sideways wandering of the material web between pre-stamping and cutting, since otherwise too much dirt would again arise and the application of the pre-stamped path would not have achieved its purpose.

However, too wide a pre-stamped path reduces the overall cutting performance and bonds the material in areas where such bonding is really unnecessary and indeed undesirable, because the ability of the velvet to seal a film cartridge against the incidence of light is then impaired.

The object was therefore to avoid these disadvantages.

It was found that this object may be achieved if the material to be cut is subjected, in the area of the intended cut, to pre-stamping and cutting in immediate succession, under heat and with precise guidance of the separator device in relation to the pre-stamping device, said pre-stamping and cutting being effected in such a way that the plane of symmetry through the pre-stamping device, which plane of symmetry extends perpendicularly to and in the same direction as the material web, is identical to the plane of symmetry extending through the separator device.

The pre-stamping device and separator device are thus arranged in tandem closely one behind the other.

The invention also provides a device for the fusion cutting of thermoplastic sheets and textile webs, comprising a pre-stamping device and a separator device as well as at least one heat source on which the pre-stamping device and separator device are so mounted that the sheet or web to be cut may be guided between them and the at least one heat source, characterised in that the separator device is arranged in tandem closely behind the pre-stamping device in such a way that the plane of symmetry extending perpendicularly to the axis of the pre-stamping device is identical with the plane of symmetry perpendicular to the axis of the separator device.

The pre-stamping device and separator device may each be arranged on a heat source, for example an ultrasonic sonotrode. Preferably, however, the distance between them is so small that they are arranged together on one heat source.

The pre-stamping device is preferably in the form of a pre-stamping rocker, i.e. in the form of a segment of a circle when viewed in cross section. The circle has, in particular, a diameter of from 10 to 50 mm. The width is such that a stamped path arises which is at least as wide as the subsequent separating path, preferably 0.1 to 1.0 mm, especially 0.1 to 0.6 mm. The separator device is preferably in the form of a rotating or preferably stationary separator wheel, whose diameter is especially from 10 to 30 mm and whose separating face (width of circumferential surface of the wheel) is especially from 0.05 to 0.3 mm.

The points of contact of the pre-stamping device and the separator device on the web to be separated are, in particular, from 0.3 to 2 cm apart.

As the Figures, discussed below, illustrate, the distance between the pre-stamping rocker and the heat source is defined by a finely adjustable limit stop, i.e. the pre-stamping rocker does not come into contact with the heat source. In this way, the remaining material thickness to be separated by the subsequent separator wheel may be precisely determined, since the pre-stamping depth is precisely defined down to very thin residual material thicknesses, even in the case of high compressive forces. The material cannot be crushed without check. The subsequent separator wheel has to separate only very thin layers of material, which is in addition substantially constant and plastic owing to the effect of prior pre-stamping up to the limit stop. In this way, a high cutting output is obtained without wear to the pre-stamping rocker and with minimal wear to the separator wheel.

In combination with the ultrasonic sonotrode acting as the heat source, heat generation occurs only when the material is pressed against the sonotrode. When, during this contact pressure, the limit stop is reached, the compressive force against the sonotrode and thus the generation of heat are virtually cancelled. Thus, the limit stop has the effect of making the cutting performance self-regulating, or of making the cutting quality substantially independent of cutting speed and material quality.

The distance between the pre-stamping curve and the heat source depends on the type and thickness of the material to be cut and is therefore basically greater than nil and smaller than the material thickness.

Likewise, the temperature to which the material is heated by the heat source is dependent on the material. It is preferably between 100 and 200° C.

FIG. 1 is a longitudinal section of the web to be separated and the device according to the invention.

FIG. 2 shows a corresponding cross section.

Figure 1:
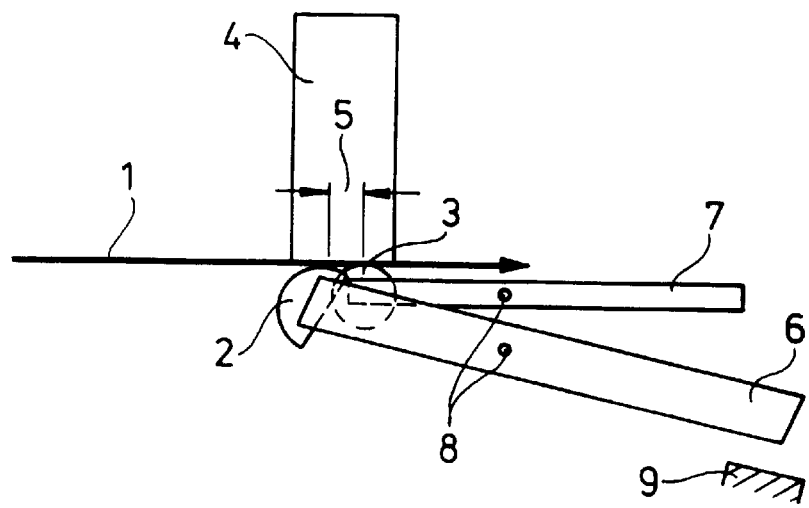
FIGS. 1 and 2 are schematic representations of the device according to the invention.

The web 1 to be separated is guided between a pre-stamping rocker 2 and a separator wheel 3 on one side and a heat source 4, e.g. an ultrasonic sonotrode. 5 designates the distance between the pre-stamping point and the separating point. 6 and 7 designate the lever arms for the pre-stamping rocker and the separator wheel, 8 the corresponding lever pivot points. A limit stop 9 determining the stamping depth is provided for the lever arm 6 of the pre-stamping rocker 2.

The means of guiding the separator wheel is designated 10. The pre-stamping width 11 and the separating width 12 are obtained. 13 is the common plane of symmetry through the pre-stamping rocker 2 and the separator wheel 3. Stamping results in the reduced web thickness 14 in the stamping area.

The arrangement relationships are such that the forces do not affect each other. Other lever arrangements than those shown, for example one-armed levers, are also possible.

The compressive forces for stamping rocker and separator wheel may be exerted by springs or pneumatic cylinders, for example. Both force systems have a certain spring action which is necessary for operation, so that the separator members may be raised, in the case of thicker portions of material or foreign bodies for example.

EXAMPLE

Figure 2:
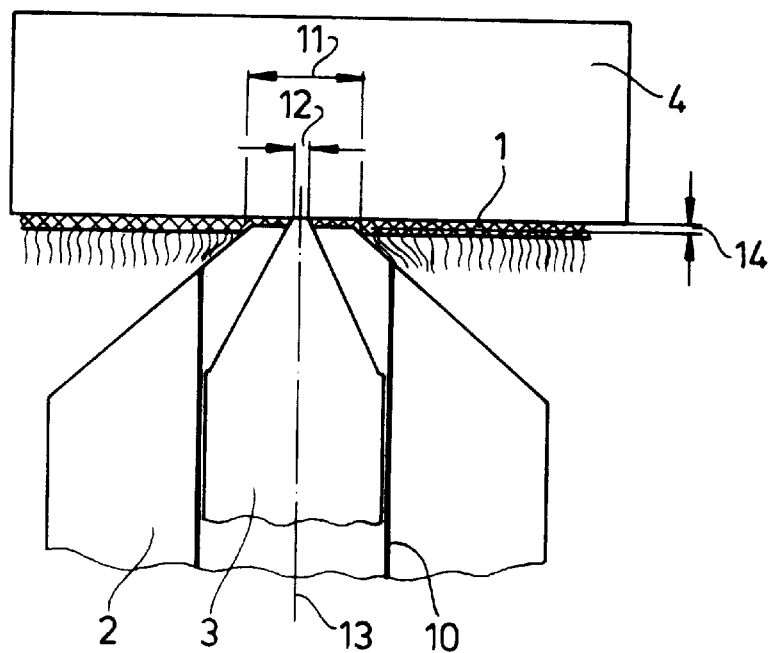

A velvet ribbon 1.6 mm thick with a backing of polyethylene terephthalate and a fleece of polyamide is cut with a device according to FIGS. 1 and 2, wherein the device has the following dimensions:

| | |
|---|---|
| Separator wheel diameter: | 16 mm |
| Diameter of the circle, a segment of which constitutes the pre-stamping rocker: | 25 mm |
| Distance between contact points of separator wheel and pre-stamping rocker: | 7 mm |
| Separating width: | 0.1 mm |
| Pre-stamping width: | 0.3 mm |
| Ribbon temperature on cutting: ca. | 150° C. |
| Ribbon speed: | 20 m/min |
| Distance between pre-stamping rocker and ultrasonic sonotrode: | 0.1 mm |
| Result: problem-free cutting, no dirt particles. | |

We claim:

1. A method for fusion cutting of thermoplastic sheets and textile webs involving bonding of cut edges, characterised in that the material to be cut is subjected, in an area of the intended cut, to pre-stamping and cutting in immediate succession, wherein pre-stamping as well as cutting are performed under heating and the heat is provided to the material in a pre-stamping device and in a cutting device by a single ultrasonic sonotrode being part of both of the pre-stamping device and the cutting device and with precise guidance of the cutting device in relation to the pre-stamping device, the pre-stamping and cutting being effected in such a way that a plane of symmetry through the pre-stamping device, which plane of symmetry extends perpendicularly to and in a direction the same as the direction of the sheet or web, is identical to a plane of symmetry extending through the cutting device.

2. A method according to claim 1, characterised in that contact points of the pre-stamping device and the cutting device on the web to be separated lie from 0.3 to 2 cm apart.

3. A method according to claim 2, characterised in that a stamped path 0.1 to 1 mm wide is created by the pre-stamping device.

4. A device for fusion cutting of thermoplastic sheets and textile webs, comprising a pre-stamping device and a cutting device as well as at least one heat source on which the pre-stamping device and the cutting device are so mounted that the sheet or web to be cut may be guided between them and the at least one heat source, characterised in that the heat source is an ultrasonic sonotrode, the cutting device is arranged in tandem closely behind the pre-stamping device in such a way that the plane of symmetry extending perpendicularly to an axis of the pre-stamping device is identical with the plane of symmetry perpendicular to an axis of the cutting device and that pressure is applied on the sheet or web between the pre-stamping device and the cutting device on one side and the ultrasonic sonotrode on the other side of the sheet or web.

* * * * *